United States Patent [19]
Borejko

[11] 4,052,644
[45] Oct. 4, 1977

[54] ELECTRONIC FLASH UNIT WITH OPERATIONAL SIGNAL

[75] Inventor: Stefan Borejko, Braunschweig-Broitzem, Germany

[73] Assignee: Rollei-Werke Franke & Heidecke, Braunschweig, Germany

[21] Appl. No.: 666,674

[22] Filed: Mar. 15, 1976

[30] Foreign Application Priority Data

Mar. 19, 1975 Germany .............................. 2511910

[51] Int. Cl.² .......................... H05B 41/32; G01J 1/16
[52] U.S. Cl. .................................... 315/151; 315/134; 315/136; 315/159; 315/241 P
[58] Field of Search ........ 315/151, 159, 129, 134–136, 315/241 P; 354/145

[56] References Cited

U.S. PATENT DOCUMENTS

| 3,706,911 | 12/1972 | Wilwerding ..................... | 315/151 X |
| 3,979,639 | 9/1976 | Adams, Jr. ........................ | 315/134 X |
| 3,983,448 | 9/1976 | Nakanishi ............................ | 315/151 |

*Primary Examiner*—Eugene R. LaRoche
*Attorney, Agent, or Firm*—Stonebraker, Shepard & Stephens

[57] ABSTRACT

An electronic flash unit having the conventional flash tube, storage capacitor dischargeable through the flash tube, measuring device for recording the quantity of light emitted by the flash tube and reflected back from the subject being photographed, a pulse generator responsive to the measured reflected light, and means for quenching the flash in response to a pulse produced when the measured reflected light reaches a threshold value. The present flash unit, in addition to the conventional features just mentioned, includes the novel feature of a light-emitting diode which becomes illuminated when the light measuring means and the pulse generator circuit become operative, thus signalling to the user of the device that the so-called "computer" mechanism has actually operated. Circuit means is provided for extinguishing the light-emitting diode at the proper time. By incorporating such a light-emitting diode in the flash unit, the operator is informed of the operativeness of the computer in a more satisfactory way than is possible with prior art devices which notify the operator, the present invention being particularly useful in informing the operator of the functioning of the computer mechanism during each flash in a rapid succession of flashes, not possible in the customary prior art constructions.

10 Claims, 3 Drawing Figures

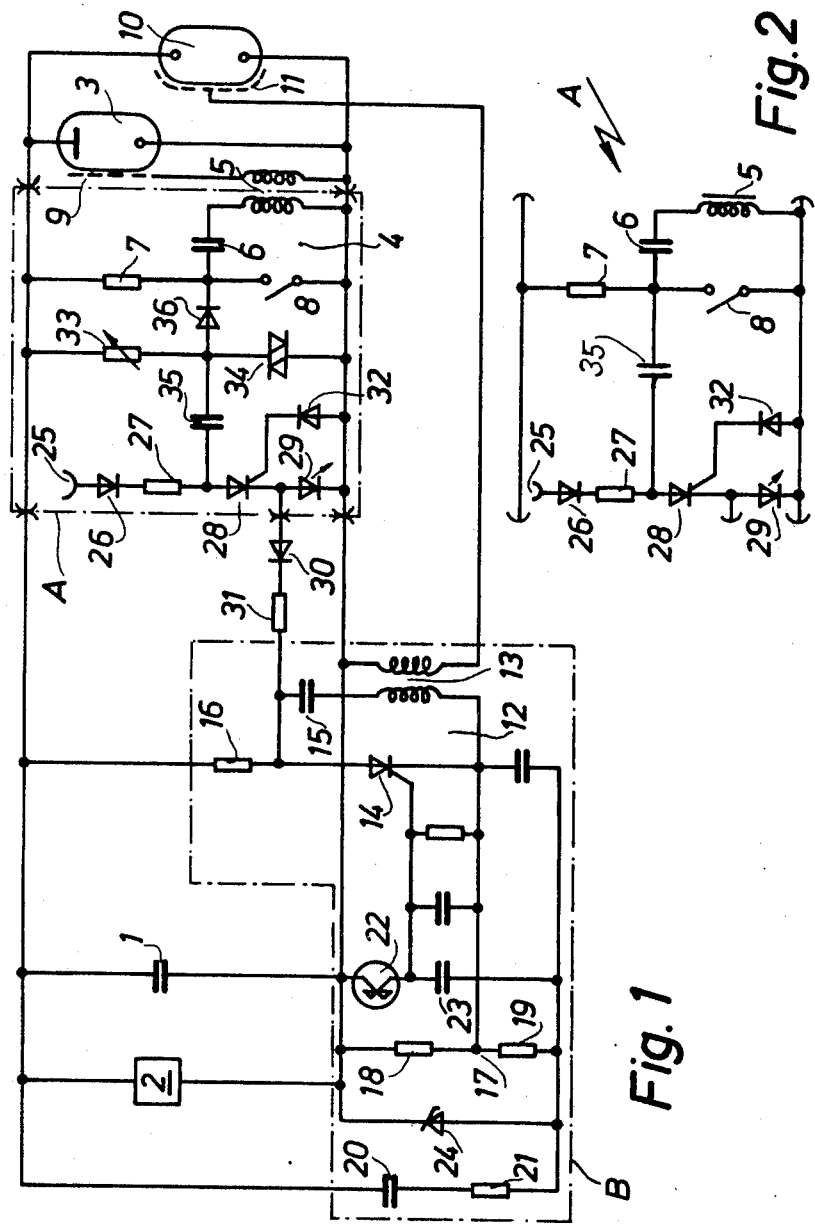

ELECTRONIC FLASH UNIT WITH OPERATIONAL SIGNAL

BACKGROUND OF THE INVENTION

The invention relates to an electronic flash unit comprising a flash tube, a storage capacitor dischargeable through the flash tube, a flash ranging or measuring device to record the quantity of light emitted by the flash tube and reflected by the photographic object (i.e., the subject being photographed), a pulse generator circuit capable of being switched on or rendered operative when an adjustable threshold value of the recorded or measured quantity of light is reached, and a device to quench the flash tube, which device can be switched on by means of a pulse generated by the pulse generator circuit. Flash apparatus of this general type is well known in the art, and the present invention deals with improvements therein.

With such electronic flash units, it is often desired that the photographer should be able to keep a constant check on whether the flash ranging or measuring device, the pulse generator circuit, and the flash tube quenching device, (usually collectively termed a "computer") have become operative when the photograph was taken.

In one known electronic flash unit of this kind, the quenching device for the flash tube contains a gas-filled short-circuiting tube or thyratron, which short-circuits the flash tube at the moment when the thyratron ignites. Such a thyratron emits, in its current-carrying state, a visible light, which is utilized for checking the operation of the computer. To accomplish this, a light guide bar or conductor extends from the thyratron to a window in the surface of the casing or housing of the unit. Thus the photographer can observe the lighting-up of the thyratron during the short-circuiting of the flash tube. Since the lighting-up time of such a thyratron is only a few milliseconds, a fluorescent, luminescent or phosphorescent disk is provided at or near the window at the end of the light guide bar. Due to the afterglow of this disk, it is possible for the photographer to see, even after completion of the flash process, whether the blocking device has become operative during the preceding flash radiation.

This display of the operation of the computer has a decisive disadvantage. Although the afterglow of the fluorescent disk indicates to the operator that the computer has become operative once, yet when there is a plurality of flash releases in rapid succession the operator cannot tell whether the computer has worked in each individual case. Therefore, he is also unable to find out when the computer may have failed for the first time. Moreover, such an indicating device comprising a light guide bar is relatively expensive and, due to the necessary space requirement, it cannot be used in so-called compact flash units, in which all the structural elements are housed in a very narrow space.

Furthermore, such an indicating device requires that the quenching device of the flash tube includes a structural element which emits a visible light. However, in specific cases of application, particularly in order to achieve high-speed flash sequences, such a gas-filled switching tube, which can only be quenched through the voltage breaking down at its anode-cathode path, has to be replaced by a semi-conductor element, preferably a thyristor, which can be forcibly blocked in spite of the fact that voltage is applied to its anode-cathode path. However, such a thyristor does not emit any visible light, so that in these cases there is no basis whatsoever for an indicating device of the kind above mentioned.

The task underlying the present invention, therefore, is to provide an electronic flash unit of the general type or kind mentioned at the beginning, with a device indicating the operation of the flash unit computer, which device avoids the disadvantages described above, and does not depend on the presence of a switching element emitting a visible light and which will give a signal that is constant in its intensity over a selectable period.

According to the present invention, this problem is solved by providing a light-emitting diode, which is connected to a direct current source via an electronic switch which closes in response to a signal derived from the pulse generator circuit or the quenching device and which opens automatically after an adjustable closing period.

SUMMARY OF THE INVENTION

According to a preferred embodiment of the invention, the electronic switch of an electronic flash unit whose pulse generator circuit comprises a chargeable capacitor, which is dischargeable by short-circuiting, is designed as a thyristor whose cathode is connected, on the one hand, via a diode to the positive potential plate of the charged capacitor, and, on the other hand, to the anode of a light-emitting diode, whose cathode is connected via a further diode to the control electrode of the thyristor. A capacitor, which is discharged during the closed phase of the thyristor, is connectable, after an adjustable closing period, in parallel with the series connection of the thyristor and the light-emitting diode, so that its plate having a positive potential is connected to the cathode of the light-emitting diode.

In a further development of the invention, the closing period of the thyristor is determined by a series connection of an adjustable resistor and a diac, which series connection is connected in parallel with the storage capacitor, the capacitor which is chargeable during the closing phase of the thyristor being connected between the anode of the thyristor and the connecting point of the resistor and diac, and the cathode of the light-emitting diode being connected to the low potential plate of the storage capacitor.

In this way, the capacitor is charged, while the thyristor is conductive, by the operating voltage of the storage capacitor at a time constant which is determined by the resistance value of the adjustable resistor until the diac reaches its break-down voltage and suddenly becomes conductive, its current-flow resistance dropping suddenly in known manner. The capacitor is discharged via the diac and the thyristor is blocked. The light-emitting diode thus emits light for a specific length of time, the light intensity being constant.

In order to insure, even in a very rapid succession of flashes, that the computer operation indicating device has always gone out before a next flash is released, the connection point of the capacitor and the diac or the resistor is connected, according to a further development of the invention, via a diode to the synchronous contact of the flash unit, so that upon closure of the synchronous contact the charged capacitor is connected to the thyristor in high-resistance directions and the thyristor consequently changes over to its blocking state, regardless of whether the breakdown voltage of the diac has been reached or not.

In a simplified modification of the invention, the function of the diac can also be taken over completely by the synchronous contact of the flash unit. This eliminates the adjustable resistor, the diac and the diode, and the capacitor which is chargeable in the closed phase of the thyristor is inserted directly between the anode of the thyristor and the synchronous contact, namely on the high-tension side of the synchronous contact. Since the high-tension side of the synchronous contact is connected to the ignition pulse capacitor of the flash tube ignition device and the latter is charged by the storage capacitor via a resistor, the capacitor is also charged via this resistor during the closed phase of the thyristor and is connected to the thyristor in the high-resistance direction when the synchronous contact is closed. The closing time of the thyristor, and consequently the light-emitting time of the diode, is determined by the time sequence of the consecutively triggered flashes.

According to a further embodiment of the invention, the flash unit has a quenching device which comprises a switching thyristor placed in series with the flash tube and becoming conductive with it, and a quenching circuit to block this switching thyristor. The electronic switch connecting the light-emitting diode to the direct current source is designed as a thyristor whose control grid is connected to the voltage tap of a voltage divider, which is connected in parallel with a capacitor connected to the anode and cathode of the switching thyristor. A capacitor, which is charged during the closed phase of the thyristor, is connectable in parallel with the series connection of the thyristor and the light-emitting diode after an adjustable closing period, so that its plate having a positive potential is connected to the cathode of the light-emitting diode.

This circuit arrangement is distinguished in that the triggering pulse for the thyristor is not taken from the pulse generator circuit but is taken from the flash tube quenching device of the computer, and in that the effect is utilized that the recovery time of the thyristor is substantially shorter than the quenching time of the flash tube.

In a further development of this embodiment, measures identical to those described hereinbefore are taken, such as the connection in parallel of a series connection of the adjustable resistor and the diac with the storage capacitor and the connection of the thyristor anode and the connecting point of resistor and diac by the capacitor which is chargeable during the closed phase of the thyristor, and the connection of the connecting point of the capacitor, the adjustable resistor and the diac via a diode to the high-tension side of the synchronous contact.

BRIEF DESCRIPTION OF THE DRAWINGS

FIG. 1 is a circuit diagram of one embodiment of an electronic flash unit comprising a computer operation indicating device, in which the closing pulse for the electronic switch is derived from the pulse generator circuit of the computer;

FIG. 2 shows a variant of the indicating device shown in FIG. 1; and

DESCRIPTION OF THE PREFERRED EMBODIMENTS

Figure 3:
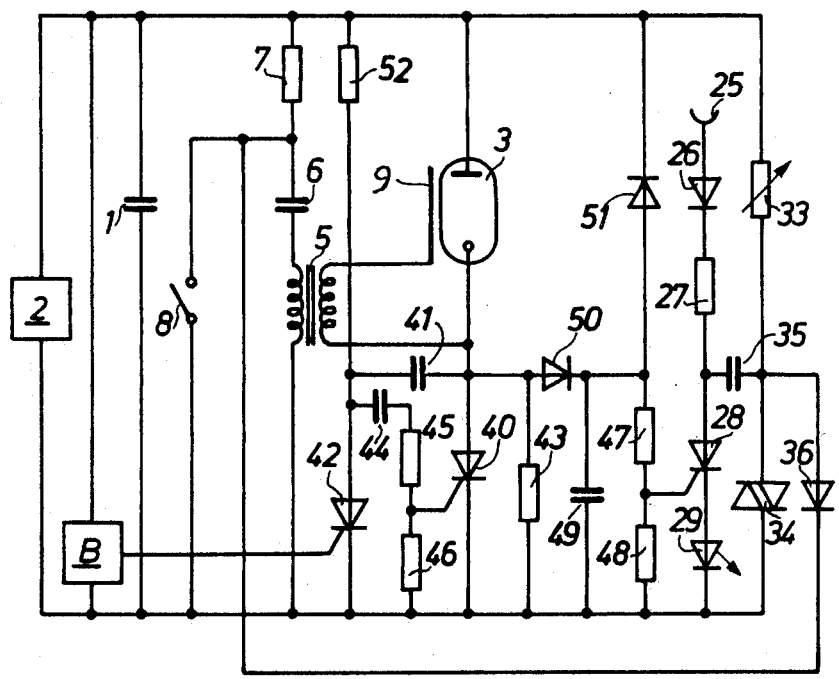
FIG. 3 is a circuit diagram of an electronic flash unit comprising a computer operation indicating device, in which the closing signal for the electronic switch is taken directly from the flash tube quenching device.

In FIG. 1, there is designated by 1 a storage capacitor, which is chargeable to an operating voltage of approximately 360 Volts by a direct current source, for example a DC to DC converter 2, and which is dischargeable via a flash tube 3. For the ignition of the flash tube there is provided an ignition device 4, which consists of a pulse transformer 5 with a primary winding and a secondary winding, an ignition capacitor 6, a resistor 7, and the synchronous contact 8 of the flash unit. The resistor 7, the ignition capacitor 6, and the primary winding of the pulse transformer 5 are in series with each other and in parallel with the storage capacitor 1. The series connection of the ignition capacitor 6 and the primary winding of the pulse transformer 5 can be short-circuited via the synchronous contact 8. This synchronous contact 8 is the conventional synchronizer switch customarily found in the camera with which the flash unit is used, the switch being closed in synchronized relation to the operation of the camera shutter. The secondary winding of the transformer 5 is connected to the ignition electrode 9 of the electronic flash tube 3. Placed in parallel with the flash tube 3 is a gas-filled short-circuiting tube or thyratron 10, whose ignition electrode 11 is connected to the secondary winding of a further pulse transformer 13, which is disposed in a pulse generator circuit indicated in general at 12.

The pulse generator circuit 12 comprises a thyristor 14 in parallel with the series connection of a capacitor 15 and the primary winding of the pulse transformer 13. This parallel connection is connected through resistor 16 to the positive high potential plate of the storage capacitor 1, and is also connected, as shown in the circuit diagram, to the voltage tap or intermediate tap 17 of a voltage divider consisting of the resistors 18 and 19. This voltage divider is connected in parallel with the storage capacitor 1, in series with a capacitor 20 and a resistor 21, and serves for supplying voltage to the flash ranging or measuring device of the flash unit. This flash measuring device comprises a photo transistor 22 and an integrating capacitor 23. A Zener diode 24 serves for stabilizing the supply voltage.

A pole 25 of a direct current source has a positive potential, for example 5 Volts, relative to the connecting line between the storage capacitor 1 and the cathode of the flash tube 3, which connecting line carries a zero potential. This pole 25 is connected to this connecting line through the series connection of a diode 26, a resistor 27, a thyristor 28 and a light-emitting diode 29. The cathode of the thyristor 28 and the anode of the light-emitting diode 29 are connected through a diode 30 and a resistor 31 to that plate of the capacitor 15 which has a positive potential in its charged state, and also to the anode of the thyristor 14 in the pulse generator circuit 12. The cathode of the light-emitting diode 29 is connected via a diode 32 to the control electrode or gate of the thyristor 28. The series connection of an adjustable resistor 33 and a diac 34 is in parallel with the storage capacitor 1. The connection point between the resistor 33 and the diac 34 is connected, on the one hand, through a capacitor 35 to the anode of the thyristor 28 and, on the other hand, through a diode 36 to that plate of the ignition capacitor 6 which carries a positive potential in its charged state, and to the high-tension side of the synchronous contact 8.

This circuit arrangement operates as follows:

When the electronic flash unit is ready for operation, the storage capacitor 1, the ignition capacitor 6, the capacitor 15 in the pulse generator circuit 12, and the capacitor 20 are charged. Upon the closure of the synchronous contact 8, the ignition capacitor 6 is discharged in known manner and applies an ignition pulse via the ignition transformer 5 to the ignition electrode 9 of the flash tube 3. The latter ignites, and the storage capacitor 1 begins to discharge via the flash tube, light being radiated to the subject being photographed. At the same time, the capacitor 20 is discharged via the now conductive flash tube 3, the voltage divider 18, 19, and the resistor 21. During this discharging phase of the capacitor 20, a supply voltage that has been kept constant by the Zener diode 24 is applied to the series connection of the photo transistor 22 and the integrating capacitor 23. The photo transistor 22 charges the integrating capacitor 23 with a current that is proportional to the quantity of light which is emitted by the flash unit, is reflected by the photographic object and impinges on the photo transistor 22. As soon as the integrating capacitor 23 has reached an adjustable threshold value, the thyristor 14 in the pulse generator circuit ignites through (i.e., becomes conductive) and the capacitor 15 is discharged via the primary winding of the pulse transformer 13, whereby an ignition pulse is delivered to the ignition electrode 11 of the thyratron 10 and the latter becomes conductive and short-circuits the flash tube 3, extinguishing the flash.

At the moment when the thyristor 14 ignites, the cathode potential of the thyristor 28 of the indicating device is suddenly applied to the plate of the charged capacitor 15, which plate has a low potential. Since the control electrode of the thyristor 28 always has a potential that is reduced relative to the zero potential by the through-passing voltage of the diode 32, there develops between the control electrode and cathode of the thyristor 28 a voltage difference which ignites the thyristor 28. As a result, a current flows from the positive pole 25 of the direct current source to the zero potential, and the light-emitting diode is lit up, indicating the response of the computer.

While the diode 29 emits light, the capacitor 35 is charged via the adjustable resistor 33 until the breakthrough voltage (approximately 30 Volts) of the diac 34 is reached. Then the diac breaks through, and the positively charged plate of the capacitor 35 is applied directly to the zero potential. This voltage jump is transferred via the capacitor 35 to the anode of the thyristor 28, so that the anode potential of the latter is substantially lower than its cathode potential for the duration of the discharge of the capacitor. The thyristor 28 is blocked. It is possible to determine the length of time during which the diode emits light by adjustment of the value of resistance of the resistor 33. This length of time corresponds to the time which is required for charging the capacitor 35 to the break-through voltage of the diac 34.

If the light-emission period of the light emitting diode 29 has been set for a very long time, it may be that the time until the next flash release is shorter than the time that is required for charging the capacitor to the break-through voltage of the diac 34. In this case, the light-emitting diode will still be emitting light when the next flash is released through closure of the synchronous contact 8. However, in this event, the capacitor 35, which has been charged to a partial voltage, is locked, via the diode 36, on the thyristor 28, so that the latter blocks immediately after closure of the synchronous contact 8, before the computer can respond to the next flash. Thus it is insured that the light-emitting diode is switched off in any case when a new flash is to be released and that the indicating device can only be switched on directly as a result of the computer response to the emitted flash.

In FIG. 2, there is shown a simplified circuit arrangement of the indicating device, which can be readily used in place of the portion of the circuit arrangement which is within the dot-dash rectangle designated by A in FIG. 1. All the structural elements are identical and have therefore been provided with the same reference symbols. In this simplified circuit, the adjustable resistor 33, the diac 34, and the diode 36 have been eliminated, and the capacitor 35 is directly connected to the high-tension side of the synchronous contact 8 or to the positive potential plate of the ignition capacitor 6 respectively. This circuit arrangement works in the same manner as that described in the above, apart from the fact that the self-sustained switching-off of the light-emitting diode 29 after a predeterminable time has been eliminated. The light-emitting diode always emits light until either the synchronous contact 8 is closed for the release of a new flash or the main appliances switch of the flash unit is switched off and the DC to DC converter 2 and the direct current source 25 are consequently disconnected.

In FIG. 3, a further embodiment of a flash unit is shown in which the closing pulse for the thyristor 28 is not derived from the pulse generator circuit, as shown in FIG. 1, but is derived from the flash tube quenching device. In contrast to FIG. 1, the flash tube quenching device shown in FIG. 3 consists of a switching thyristor 40, which is placed in series with the flash tube 3 and which becomes conductive with the flash tube and which can be blocked at any time by means of a quenching circuit as soon as the quenching device is activated by the pulse emitted by the pulse generator circuit 12. The quenching circuit comprises a quenching capacitor 41 and a thyristor 42, whose control grid or gate is connected to the secondary winding of the pulse transformer 13 in the pulse generator circuit 12.

The construction of the flash measuring device and the pulse generator circuit is identical with the portion B which is surrounded by dash-dotted lines in FIG. 1, and is schematically shown at B in FIG. 3. The series connection of the quenching capacitor 41 and the thyristor 42 is connected in parallel with the switching thyristor 40. The connecting point of the anode of the thyristor 42 and the quenching capacitor 41 is connected via a resistor 52 to the positive potential plate of the storage capacitor 1. Due to the ionization of the flash tube 3, the switching thyristor 40 is automatically ignited as soon as an ignition pulse is applied to the ignition electrode 9 of the flash tube. To this end, a resistor 43 is connected in parallel with the switching thyristor 40, and the series connection of a capacitor 44 and a voltage divider, consisting of the resistors 45 and 46, is connected, together with the capacitor 41, in parallel with the storage capacitor. The voltage tap of the voltage divider 45, 46 is connected to the control electrode of the switching thyristor 40.

The indicating device for checking the operation of the computer part is identical in construction with the indicating device shown in FIG. 1, so that identical structural parts have been provided with identical reference symbols. Only the connection of the light-emitting diode cathode to the control electrode of the thyristor 28 via the diode 32 is eliminated. In this case, the control electrode of the thyristor 28 is connected to the voltage tap of a voltage divider consisting of the resistors 47 and 48. This voltage divider is placed in parallel with a capacitor 49, which is connected to the cathode and the anode of the switching thyristor 40. There is furthermore inserted in the connecting line from the thyristor anode to the capacitor a diode 50, and the connecting point of the capacitor 49 and cathode of this diode 50 is connected via a further diode 51 to the anode of the flash tube 3.

This circuit arrangement of FIG. 3 operates as follows:

Upon the ignition of the flash tube 3, the switching thyristor 40 also becomes conductive, and the storage capacitor 1 is discharged via the flash tube 3 and the switching thyristor 40. The light reflected by the photographic object is recorded in the flash measuring device, and when a specific value of the measured quantity of light is reached, the thyristor 42 is ignited via the pulse generator circuit 12, schematically shown here at B. The quenching capacitor 41, which as been charged to the operating voltage, is discharged via the thyristor 42 and the resistor 43, so that a negative voltage is applied to the switching thyristor 40 during the period in which the capacitor 41 is discharged, and the switching thyristor 40 blocks. Since the recovery time of the thyristor is substantially shorter than the time required for deionization of the flash tube 3, a current still flows from the storage capacitor 1 via the flush tube 3, the diode 50, and the capacitor 49 after the switching thyristor has blocked, whereby the capacitor 49 is charged. As soon as the capacitor has been charged, the flash tube 3 goes out. When a specific voltage value has been reached by the capacitor, a voltage is applied to the resistor 48 of the voltage divider which is sufficient to ignite the thyristor 28 in the indicating device. The light-emitting diode 29 lights up and indicates the preceding operation of the computer. The quenching of the light-emitting diode 29 follows after a specific preselectable time, as described in conjunction with FIG. 1, and so does the quenching of the light-emitting diode when the synchronous contact 8 closes for the next flash release.

Of course, it is also possible to use in this circuit arrangement the indicating device shown in FIG. 2 instead of the indicating device shown here. In this case, all that is necessary in FIG. 2 is to interrupt the connection of the control electrode of the thyristor 28 to the cathode of the light-emitting diode 29, and to connect the control electrode to the voltage tap of the voltage divider 47, 48.

What is claimed is:

1. An electronic flash unit, comprising a flash tube, a storage capacitor dischargeable through said flash tube, flash measuring means responsive to the quantity of light emitted by the flash tube and reflected back from a photographic subject being photographed, a pulse generator circuit device, means for rendering said pulse generator circuit device operative to produce a pulse when an adjustable value of light has been measured by said measuring means, a flash tube quenching device, and means for rendering said quenching device operative in response to said pulse, characterized by a direct current source (25), an electronic switch, a light-emitting diode (29) connected to said direct current source (25) through said electronic switch, means for closing said electronic switch in response to a signal derived from one of said devices, and means for opening said electronic switch automatically after an adjustable closing period.

2. The invention defined in claim 1, wherein said pulse generator circuit device includes a chargeable capacitor (15) having a positive potential on one plate when said chargeable capacitor is charged, and wherein said electronic switch comprises a thyristor (28) having an anode, a cathode, and a control electrode, a connection from the cathode of said thyristor to said positive potential plate of said capacitor (15), a connection from the cathode of said thyristor to an anode of said light-emitting diode (29), a second diode (32), a connection from a cathode of said light-emitting diode (29) through said second diode (32) to the control electrode of said thyristor (28), another capacitor (35) chargeable during a closed phase of said thyristor, and means connecting said other capacitor (35) in parallel to a series circuit of said thyristor and light-emitting diode in series with each other, said last named connecting means serving to connect a positive potential plate of said other capacitor (35) to said cathode of said light-emitting diode.

3. The invention defined in claim 1, wherein said flash tube quenching device includes a switching thyristor (40) arranged in series with said flash tube (3), and wherein said quenching device serves to block said switching thyristor, and wherein said electronic switch comprises another thyristor (28), each of said thyristors having an anode, a cathode, and a control electrode, further including a voltage divider (47, 48) having an intermediate tap connected to the control electrode of said other thyristor (28), a capacitor (49) connected in parallel with said voltage divider, a connection from one side of said capacitor (49) to the anode of said switching thyristor (40), a connection from the other side of said capacitor (49) to the cathode of said switching thyristor (40), another capacitor (35) charged during a closed phase of said other thyristor (28), and means connecting said other capacitor (35) in parallel with a series connection of said other thyristor (28) and said light-emitting diode (29) in such manner that a positive potential plate of said other capacitor is connected to a cathode of said light-emitting diode.

4. The invention defined in claim 1, wherein said storage capacitor (1) has a low potential plate and a high potential plate, and wherein said electronic switch includes a thyristor (28) having an anode, a cathode, and a control electrode, further comprising an adjustable resistor (33) and a diac (34) in series with each other and in parallel with said storage capacitor (1), another capacitor (35) chargeable during a closed phase of said thyristor (28), a connection from one side of said other capacitor (35) to the anode of said thyristor (28), and a connection from the other side of said other capacitor to a connection point between said adjustable resistor (33) and said diac (34).

5. The invention defined in claim 1, wherein said electronic switch comprises a thyristor (28) having an anode, a cathode, and a control electrode, further comprising an ignition capacitor (6) chargeable through a resistor (7) in series therewith, said ignition capacitor (6) being arranged to be short circuited by a synchronous contact switch (8), another capacitor (35) chargeable during a closed phase of said thyristor, a connection from one side of said other capacitor (35) to the anode of said thyristor, a connection from the other side of said other capacitor to a connection point between said resistor (7) and said synchronous contact switch (8) and to a connection point between said resistor (7) and said ignition capacitor (6), and a connection from a cathode of said light-emitting diode (29) to a low potential plate of said storage capacitor (1).

6. The invention defined in claim 5, further including a diode (36) operatively inserted in said connection between said other side of said other capacitor (35) and said resistor (7) and ignition capacitor (6) and contact switch (8).

7. The invention defined in claim 1, further comprising means for adjusting the length of time that light is produced from said diode in response to an operating cycle of said computer means.

8. The invention defined in claim 9, wherein said adjusting means includes a capacitor (35) and an adjustable resistor (33).

9. An electronic flash unit comprising means for producing a light flash, computer means responsive to light reflected from a subject being photographed for terminating a light flash when the such reflected light reaches a threshold value, a light-emitting diode, and circuit means responsive to operation of said computer means for supplying current to said light-emitting diode to produce light therefrom when said computer means is operated, so that such light from said diode may serve as an indication that said computer means has operated, further comprising means for adjusting the length of time that light is produced from said diode in response to an operating cycle of said computer means.

10. The invention defined in claim 9, further comprising means responsive to initiation of a second flash following shortly after a first flash, for discontinuing production of light from said diode if said diode, in response to operation of said computer means as a result of said first flash, is still producing light when said second flash is initiated.

* * * * *